United States Patent Office  3,024,277
Patented Mar. 6, 1962

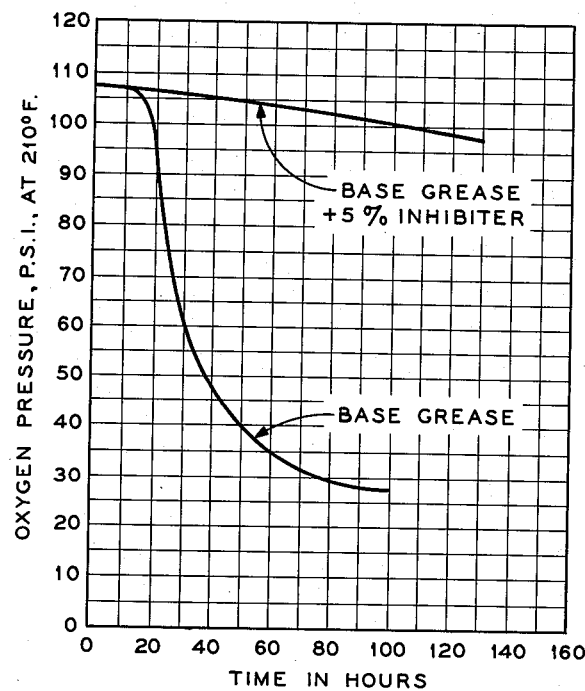

3,024,277
AMIDES OF ALKYLENEDIAMINE POLYALKYL-ENECARBOXYLIC ACIDS
Bruce W. Hotten, Orinda, Calif., assignor to California Research Corporation, San Francisco, Calif., a corporation of Delaware
Filed Mar. 18, 1959, Ser. No. 800,315
5 Claims. (Cl. 260—534)

This invention relates to new compositions of matter. More specifically, the invention relates to new compositions of matter which are particularly useful as rust inhibitors and oxidation inhibitors for lubricants, e.g., greases, at high temperatures.

This application is a continuation-in-part of Hotten patent application Serial No. 683,156, filed September 10, 1957 (now abandoned), which, in turn, is a division of Hotten patent application Serial No. 591,049, now patent No. 2,954,342 filed June 13, 1956.

Modern usage and increasingly severe requirements necessitate, among other things, the use of rust inhibitors and oxidation inhibitors for lubricating oil compositions, for example, greases, which are capable of performance at high temperatures. Many inhibitors are available, e.g., tertiary butyl phenols and hydroquinone, which are effective as oxidation inhibitors but which are volatile and evaporate from lubricating oil compositions at high temperature.

It is an object of the present invention to provide new compounds which are effective as emulsifying agents, effective for inhibiting rust formation, and inhibiting oxidation of lubricants, particularly greases, at high temperatures.

This and other objects of the invention will be apparent from the ensuing description and the appended claims.

In accordance with the present invention, certain amides of alkylene diaminetetraalkylenecarboxylic acids, and/or certain homologues, are useful as oxidation inhibitors for lubricating oil compositions, particularly for greases. This class of compounds has been found to be highly effective for this purpose, particularly at high temperatures, since the compounds have a desirably low volatility.

The new compositions of matter of the invention can be represented by the following type formula:

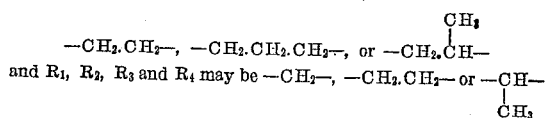

wherein R is an alkylene radical containing two or three carbon atoms (i.e., alkylene radicals containing from 2 to 3 carbon atoms, such as the ethylene, trimethylene and propylene radicals); $R_1$, $R_2$, $R_3$ and $R_4$ are alkylene radicals containing one or two carbon atoms (i.e., methylene, ethylene, and ethylidene radicals); Y is a radical selected form the group consisting of —$OR_8$ and $$—N(H)_c—(R_6)_d$$

Z is a radical selected from the group consisting of —$OR_8$ and —$N(H)_e—(R_7)_f$; W is a radical selected from the group consisting of $OR_8$ and —$N(H)_g(R_9)_h$ $R_5$, $R_6$, $R_7$ and $R_9$ are saturated or unsaturated hydrocarbon radicals containing from 5 to 22 carbon atoms, e.g., alkyl radicals containing 5 to 22 carbon atoms; $b$, $c$, $e$ and $g$ are numbers selected from the group consisting of 0 and 1; $a$, $d$, $f$ and $h$ are numbers selected from the group consisting of 1 and 2; such that $a+b=2$, $c+d=2$, $e+f=2$, and $g+h=2$; and $R_8$ represents hydrogen, an alkyl radical, or a metal.

That is, in the type formula above, R may be

—$CH_2.CH_2$—, —$CH_2.CH_2.CH_2$—, or —$CH_2.\overset{CH_3}{\underset{|}{C}H}$— and $R_1$, $R_2$, $R_3$ and $R_4$ may be —$CH_2$—, —$CH_2.CH_2$— or —$\overset{}{\underset{|}{C}H}$—
$\phantom{and R_1, R_2, R_3 and R_4 may be —CH_2—, —CH_2.CH_2— or —}CH_3$ The new compounds described herein can be prepared by reacting a carboxylic acid with an alkylene diamine to form the desired alkylenediaminetetraalkylenecarboxylic acid (e.g., alkylenediaminetetraacetic acid), which, in turn, is reacted with an aliphatic primary or secondary amine to form the alkylenediaminetetraalkylenecarboxylic acid derivative (e.g., mono-, di-, or triamides of alkylenediaminetetraacetic acid).

When the new compounds herein are used as oxidation inhibitors, rust inhibitors, etc., it is preferred that $R_5$, $R_6$, $R_7$ and $R_9$ contain from 12 to 22 carbon atoms. However, in the use of these new compounds as lubricating oils, it is preferred that secondary amines be used in the formation of these compounds, each hydrocarbon radical of the secondary amines containing from 5 to 12 carbon atoms.

The following specific examples will serve further to illustrate the practice and advantages of the invention:

*Example 1.*—50 grams of ethylenediaminetetraacetic acid and 156 grams of "octadecylamine" were reacted by mixing and heating the reactants to 400° F. until evolution of water had ceased. The reaction which occurred was as follows:

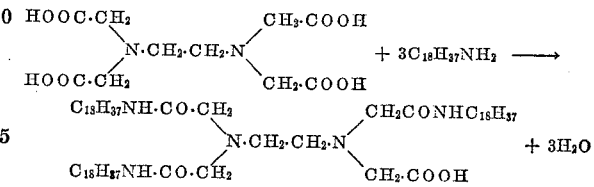

The crude product was recrystallized from ethyl alcohol to yield a cream-colored solid melting at 90–96° F. Analysis proved that only three of the carboxyls of ethylenediaminetetraacetic acid reacted. Apparently, steric hindrance or some other factor renders the fourth carboxyl difficult to react with the amine.

The "octadecylamine" used herein was a commercial preparation known as "Armeen HT," sold by the Armour Company, Chicago, Illinois, and containing 25% hexadecylamine, 70% octadecylamine, and 5% octadecenylamine. 85% of this mixture consists of n-primary amines.

In the above equation, the octadecylamine can be replaced by primary or secondary amines wherein the hydrocarbon radical contains from 5 to 22 carbon atoms. For example, the resulting compounds can be represented by the formula:

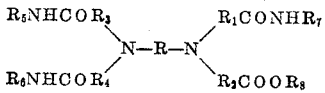

wherein R, $R_1$, $R_2$, $R_3$, $R_4$, $R_5$, $R_6$, $R_7$ and $R_8$ are the same as identified hereinabove.

*Example 2.*—In testing the utility of these new compounds as oxidation inhibitors, five grams of the recrystallized product of Example 1 were incorporated in 95 grams of a grease comprising approximately 88 parts by weight of a solvent refined California paraffin base oil having a viscosity of 480 SSU at 100° F., the oil being thickened with 12% by weight of lithium stearate. The added inhibitor (product of Example 1) was incorporated by warming the grease to 200° F. and stirring in the inhibitor with a spatula. The inhibitor dispersed readily in the grease to form a stable dispersion.

The base grease (no inhibitor) and the same grease compounded with the new product of Example 1 as described above, were subjected to ASTM D942-50 Oxidation Test. Results of the test are set forth in the graph illustrated in the accompanying drawing in which abscissae represent time in hours and ordinates represent oxygen pressure in pounds per square inch. The test was carried out at the standard temperature of 210° F. The initial pressure in both cases was approximately 108 p.s.i.

It will be noted that in 100 hours the pressure dropped only 7 pounds in the case of the inhibited grease whereas in the same period of time in the case of the base grease the pressure dropped 81 pounds.

Further amides of alkylenediaminetetraacetic were prepared wherein only one and two amide groups form a part of the molecule; that is, monoalkylamides of alkylenediaminetetraacetic acid, and dialkylamides of alkylenediaminetetraacetic acid were prepared. Data pertaining to these further new compounds and their preparation are set forth in Table I hereinbelow:

The several components abbreviated in the table are identified as follows:

"EDTA" is ethylenediaminetetraacetic acid.

"Armeen 18D" is an octadecylamine product sold by Armour Company, and containing 98% octadecylamine.

"Armeen TD" is a distilled tallow amine containing 30% hexadecylamine, 25% octadecylamine and 45% octadecenylamine.

"Armeen SD" is a distilled amine derived from soybean oil fatty acids and containing 10% hexadecylamine, 10% octadecylamine, 35% octadecenylamine and 45% octadecadienylamine.

"Armeen 2C" is a secondary coconut amine containing 8% dioctylamine, 9% didecylamine, 47% didodecylamine, 18% ditetradecylamine, 8% dihexadecylamine and 10% dioctadecylamine.

"Armeen 2HT" is a secondary tallow amine containing 25% dihexadecylamine, and 75% dioctadecylamine.

"Armeen 2S" is a secondary soy amine containing 20% dihexadecylamine, 20% dioctadecylamine, 25% dioctadecenylamine and 35% dioctadecadienylamine.

Table I

|  | Example number | | | | | | | |
|---|---|---|---|---|---|---|---|---|
|  | 1 | 2 | 3 | 4 | 5 | 6 | 7 | 8 |
| Reactants: | | | | | | | | |
| EDTA, grams | 292 | 292 | 292 | 292 | 292 | 292 | 146 | 146 |
| Armeen 18D, grams | 270 | 540 | 810 | | | | | |
| Armeen TD, grams | | | | 520 | | | | |
| Armeen SD, grams | | | | | 528 | | | |
| Armeen 2C, grams | | | | | | 756 | | |
| Armeen 2HT, grams | | | | | | | 530 | |
| Armeen 2S, grams | | | | | | | | 530 |
| Armeen/EDTA mol ratio | 1 | 2 | 3 | 2 | 2 | 2 | 2 | 2 |
| Reaction conditions: | | | | | | | | |
| Temperature, °C | 175-225 | 175-225 | 150-215 | 160-230 | 140-160 | 170-210 | 190-210 | 180-240 |
| Time, hours | 4 | 2 | | 4 | 3 | | 5 | 4 |
| Reaction product characterization: | | | | | | | | |
| Melting point, °C | 96 | 98 | 104 | 80-87 | 61-81 | Fluid | 42 | Fluid |
| Acid number (mgms. KOH/grm. sample) | | | | 25 | 77.2 | 56 | 30 | 19 |
| Nitrogen content: | | | | | | | | |
| Found, percent | | 7.2 | | | | 5.96, 5.86 | | 4.3 |
| Theory, percent | | 8.3 | | | | | | |
| Basic nitrogen: | | | | | | | | |
| Found, percent | | [1]1.6 | [1]1.2 | [1]1.7 | | | | |
| Theory, percent | | 3.5 | 2.7 | | | | | |

[1] Only one of the basic nitrogens is titratable.

Table II hereinbelow presents further data on new compounds described herein, including data on these compounds as lubricating oils.

The Falex E.P. Test is described in "Journal of the Institute of Petroleum"; vol. 32, April 1946. The reported figures are the pounds at which seizure occurred; that is, the load under which the particular composition failed.

Table II

|  | Example number | | |
|---|---|---|---|
|  | 9 | 10 | 11 |
| Reactants: | | | |
| EDTA, grams | 73 | 292 | 292 |
| Di-n-hexylamine, grams | 185 | | |
| Armeen 2C, grams | | 1300 | |
| Armeen 18D, grams | | | 540 |
| Amine/EDTA mol ratio | 4 | 3.4 | 2 |
| Reaction conditions: | | | |
| Temperature, °C | | | 150-160 |
| Time, hours | | | 1.5 |
| | | | (2) |
| | | | (a) / (b) |
| Reaction product characterization: | | | |
| Melting point, °C | | | 192-193 / 104-105.5 |
| Acid number: | | | |
| Found, percent | | | 218 / 64 |
| Theory, percent | | | [3] 206 / [4] 70 |
| Nitrogen content, percent: | | | |
| Found, percent | 8.9 | | 7.4 / 6.34 |
| Theory, percent | [1] 8.8 | | [3] 7.7 / [4] 7.03 |
| Viscosity, SSU: | | | |
| 100° F | 3,076 | 1,353 | |
| 210° F | 123 | 114 | |
| Viscosity index | 40 | 106 | |
| Pour point, °F | 0 | 20 | |
| Falex E.P. test, pounds | 1650, 1800 | 1800, 1750 | |

[1] For triamide.
[2] At this point, the crude product was purified by crystallization from dioxane and, by means of ethyl ether, separated into light weight crystals (a), and heavy weight crystals (b). The light weight crystals and the heavy weight crystals were separately recrystallized from isopropanol.
[3] For a monoamide.
[4] For a diamide (apparently traces of triamide included in this product).

*Example 3. Grease preparation.*—A mixture of 150 grams of the oil of Example Number 10 of Table II hereinabove, 31.5 grams of methyl, N-tolylterephthalamate, and 5.4 grams of sodium hydroxide was heated to 330° F., then cooled to form a grease. The resulting grease had an ASTM dropping point of 580+° F., and an ASTM worked penetration ($P_{60}$) of 307.

It will be apparent from the above teachings that the alkylenediamine, the carboxylic acid and the aliphatic amine portions of the molecule may be varied within suitable limits. Various alkylenediamines, carboxylic acids and aliphatic amines are set forth hereinbelow in Table III to exemplify the radicals of the new compounds of the invention.

Table III

| Alkylenediamine | Carboxylic Acids | Aliphatic Amines |
|---|---|---|
| $NH_2 \cdot CH_2 \cdot CH_2 \cdot NH_2$ ethylenediamine. $NH_2 \cdot CH_2 \cdot CH_2 \cdot CH_2 \cdot NH_2$ trimethylenediamine. $NH_2 \cdot CH_2 \cdot CH \cdot NH_2$, propylenediamine. $\quad\quad\quad\mid$ $\quad\quad\quad CH_3$ | $CH_3 \cdot COOH$, acetic acid. $CH_3 \cdot CH_2 \cdot COOH$, propionic acid.[1] | Dodecylamine. Tetradecylamine. Hexadecylamine. Octadecylamine. Eicosylamine. |

[1] In the compounds of this invention, the amino nitrogen may be attached to the $\alpha$ or the $\beta$ carbon atom.

Referring to Table III and to the type formula hereinabove, R may be derived from any of the diamines listed in the left-hand column; $R_1CO-$, $R_2CO-$, $R_3CO-$, and $R_4CO-$ may be derived from any of the carboxylic acids in the middle column; $R_5$, $R_6$, $R_7$ and $R_9$ may be derived from any of the amines listed in the right-hand column. When $R_8$ of the above formula is an alkyl radical, such alkyl radical may be derived from monohydric alcohols having from 1 to 6 carbon atoms; for example, methanol, ethanol, and normal and branched chain propanols, butanols, hexanols, etc.

When $R_8$ is a metal, such a metal can be an alkali metal or an alkaline earth metal; for example, sodium, potassium, lithium, barium, calcium and strontium.

The new compounds of this invention are exemplified as follows:

Monooctadecylamide of ethylenediaminetetraacetic acid,
Monododecylamide of ethylenediaminetetraacetic acid,
Monoeicosylamide of ethylenediaminetetraacetic acid,
Monohexadecylamide of ethylenediaminetetraacetic acid,
Monooctadecylamide of trimethylenediaminetetraacetic acid,
Monododecylamide of trimethylenediaminetetraacetic acid,
Monoeicosylamide of ethylenediaminetetrapropionic acid ($\alpha$),
Monododecylamide of ethylenediaminetetrapropionic acid ($\beta$);
Dioctadecylamide of ethylenediaminetetraacetic acid,
Didodecylamide of ethylenediaminetetraacetic acid,
Dieicosylamide of ethylenediaminetetraacetic acid,
Dihexadecylamide of ethylenediaminetetraacetic acid,
Dioctadecylamide of trimethylenediaminetetraacetic acid,
Didodecylamide of trimethylenediaminetetraacetic acid,
Dieicosylamide of ethylenediaminetetrapropionic acid ($\alpha$),
Didodecylamide of ethylenediaminetetrapropionic acid ($\beta$);
Trioctadecylamide of ethylenediaminetetraacetic acid,
Tridodecylamide of ethylenediaminetetraacetic acid,
Trieicosylamide of ethylenediaminetetraacetic acid,
Trihexadecylamide of ethylenediaminetetraacetic acid,
Trioctadecylamide of trimethylenediaminetetraacetic acid,
Tridodecylamide of trimethylenediaminetetraacetic acid,
Trieicosylamide of ethylenediaminetetrapropionic acid ($\alpha$),
Tridodecylamide of ethylenediaminetetrapropionic acid ($\beta$);

including the esters and salts, e.g., derivatives in which "$R_8$" is methyl, ethyl, propyl, etc. or sodium, potassium, lithium, barium, etc.

In the use of the particular new compounds of this invention which are effective as oxidation inhibitors in greases, small amounts, generally between about 2% and 10% by weight, preferably about 2% to 6% by weight based on the finished grease, can be used. However, when such compounds are used in unthickened lubricating oils, amounts as low as 0.1% by weight may be used.

As oxidation inhibitors, these compounds may be used in various types of lubricants, including lubricating oils and thickened lubricating oils such as greases. They are preferably used in greases. Representative base oils in which these new compounds may be used include petroleum lubricating oils (naphthenic, paraffinic and mixed base oils); alkylene oxide polymers such as polypropylene oxide polymers; di-esters such as diisoamyl adipate, di-2-ethylhexyl azelate and di-2-ethylhexyl adipate, etc.

Where the particular new compounds are used as base oils in the formation of greases, the thickeners may be of various types, e.g., conventional soap-type thickeners such as sodium, lithium and calcium stearates; salts of dibasic acid-diamine condensation products such as the product of condensing a molar excess of adipic acid with hexamethylene diamine, partially neutralizing the terminal carboxyls with n-decylamine, then forming the lithium or sodium salt (see Dixon U.S. Patent No. 2,752,312, entitled "Polyamide-Polyamate Thickened Greases," filed August 19, 1952); salts of monoamides of terephthalic acid of the type formula

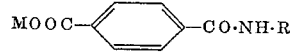

wherein R is a long-chain aliphatic group such as tetradecyl, hexadecyl or octadecyl and M is the hydrogen equivalent of a metal, e.g., sodium or lithium; and mixtures of amic acid salts such as lithium hexadecyl adipamate and dibasic acid salts such as lithium adipamate (see Dixon U.S. Patent No. 2,756,213, entitled "Amate-Dicarboxylate-Thickened Grease," filed August 19, 1952).

Preferably, the compounds of the present invention are employed in high temperature greases, by which is meant greases having dropping points of not less than about 350° F. (as determined by the ASTM D566–42 method), and which remain unctuous and do not become hard or brittle at 350° F. As oxidation inhibitors these compounds of the present invention are most advantageously used in high temperature greases and in high temperature service because of their low volatility, their stability and their effectiveness at high temperature.

I claim:
1. A compound of the type

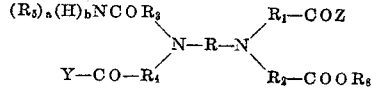

wherein R is an alkylene radical containing from 2 to 3 carbon atoms; $R_1$, $R_2$, $R_3$ and $R_4$ are alkylene radicals containing from one to two carbon atoms; Y is a radical selected from the group consisting of $-OR_8$ and $-N(H)_c(R_6)_d$; Z is a radical selected from the group consisting of $-OR_8$ and $-N(H)_e(R_7)_f$; $R_5$, $R_6$, and $R_7$ are alkyl radicals containing from 5 to 22 carbon atoms; b, c, e and g are numbers selected from the group consisting of 0 and 1; a, d, f and h are numbers selected from the group consisting of 1 and 2; such that $a+b=2$, $c+d=2$, $e+f=2$, and $g+h=2$; and $R_8$ is selected from the group consisting of hydrogen, alkyl radicals containing from 1 to 6 carbon atoms, and metals selected from the group consisting of alkali metals and alkaline earth metals.

2. A compound of the type

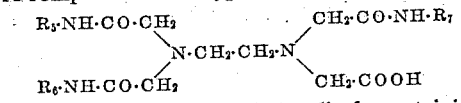

wherein $R_5$, $R_6$ and $R_7$ are alkyl radicals containing from 12 to 22 carbon atoms.

3. The compound, monooctadecylamide of ethylenediaminetetraacetic acid.

4. The compound, dioctadecylamide of ethylenediaminetetraacetic acid.

5. The compound, trioctadecylamide of ethylenediaminetetraacetic acid.

No references cited.